A. B. EDMANDS.
KNOT TYING DEVICE.
APPLICATION FILED AUG. 7, 1916.
1,291,806.
Patented Jan. 21, 1919.
3 SHEETS—SHEET 1.
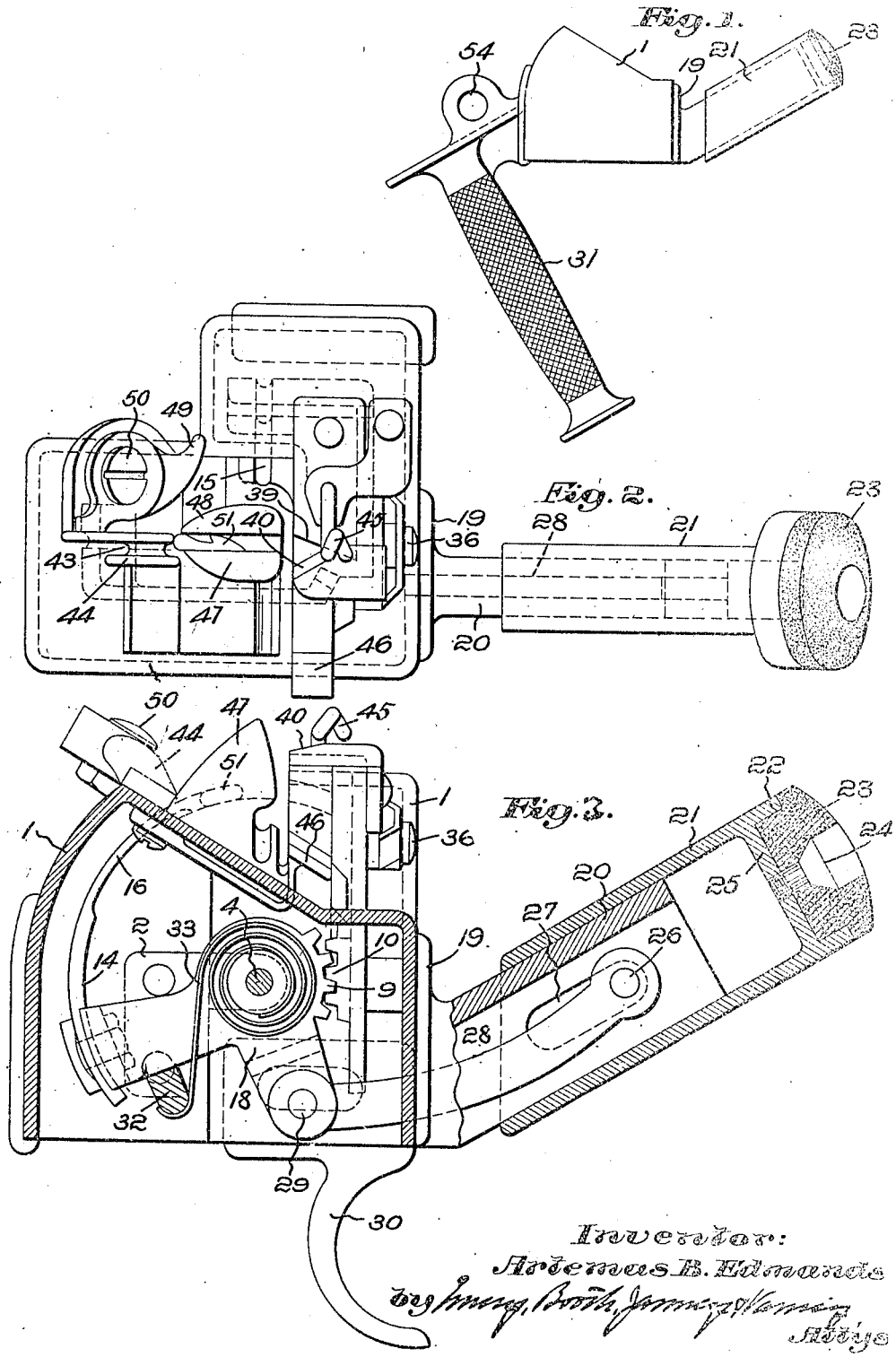

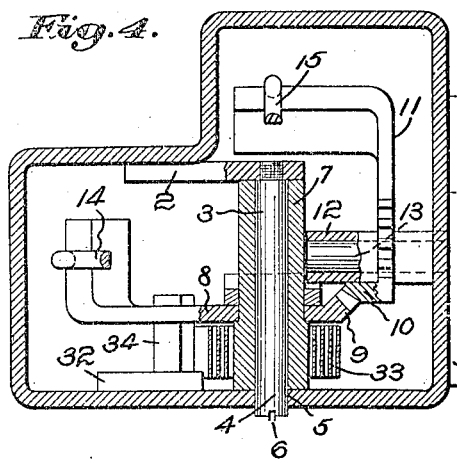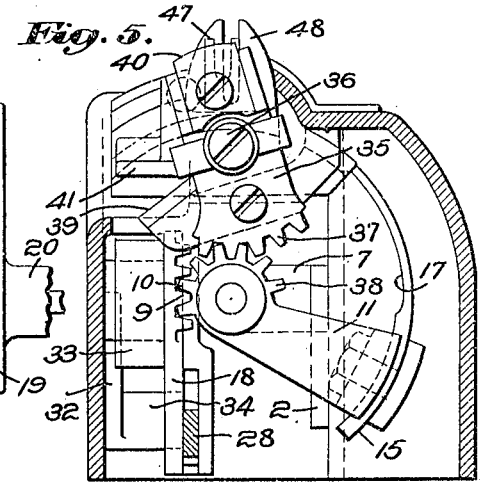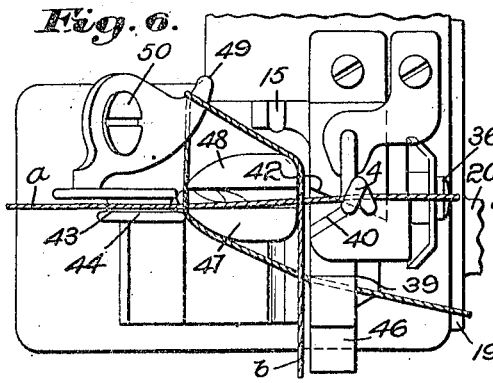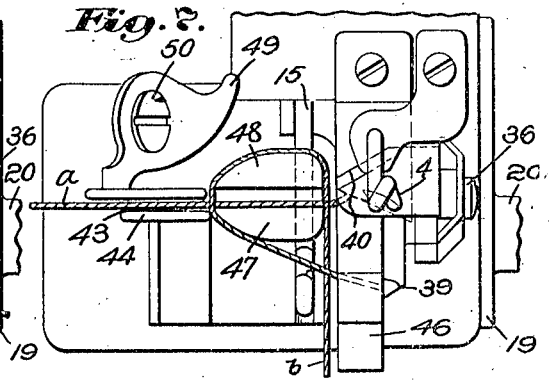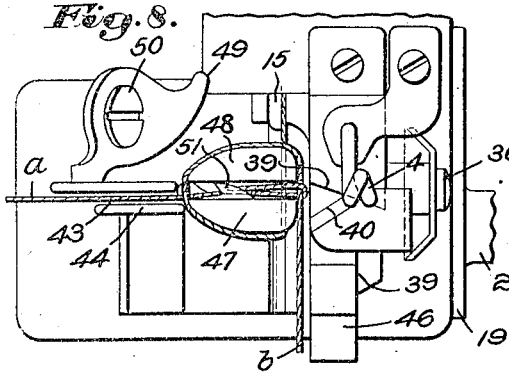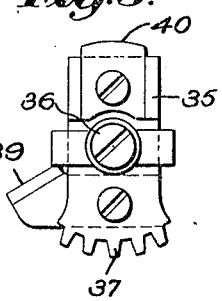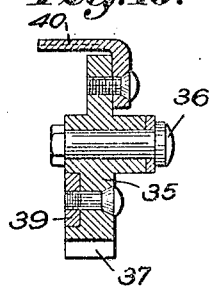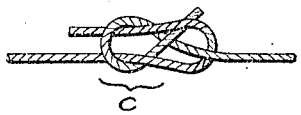

A. B. EDMANDS.
KNOT TYING DEVICE.
APPLICATION FILED AUG. 7, 1916.

1,291,806.

Patented Jan. 21, 1919.
3 SHEETS—SHEET 3.

Inventor.
Artemas B. Edmands.

UNITED STATES PATENT OFFICE.

ARTEMAS B. EDMANDS, OF PAWTUCKET, RHODE ISLAND, ASSIGNOR TO ARTHUR B. EDMANDS, OF PAWTUCKET, RHODE ISLAND.

KNOT-TYING DEVICE.

1,291,806.  Specification of Letters Patent.  Patented Jan. 21, 1919.

Application filed August 7, 1916. Serial No. 113,470.

*To all whom it may concern:*

Be it known that I, ARTEMAS B. EDMANDS, a citizen of the United States, and a resident of Pawtucket, in the county of Providence and State of Rhode Island, have invented an Improvement in Knot-Tying Devices, of which the following description, in connection with the accompanying drawings, is a specification, like characters on the drawings representing like parts.

My present invention relates to knot tying devices, and in certain aspects thereof is an improvement upon the construction shown in my Patent No. 1,112,367, dated September 29, 1914.

I have shown one embodiment of my invention in the accompanying drawings, wherein—

Figure 1 is a side elevation of a knot-tying device embodying my invention;

Fig. 2 is a plan view thereof upon a larger scale;

Fig. 3 is a side elevation thereof with the casing in vertical section;

Fig. 4 is a horizontal section upon the line 4—4 of Fig. 3;

Fig. 5 is a view partially in section at right angles to the line of section of Fig. 3 and partially in elevation, looking toward the left in said figure;

Figs. 6, 7 and 8 are plan views representing different stages in the tying of the knot;

Fig. 9 is a side elevation and Fig. 10 is a vertical section of the member carrying the thread cutters;

Fig. 11 is a view of the type of knot preferably tied by my device;

Figure 12:
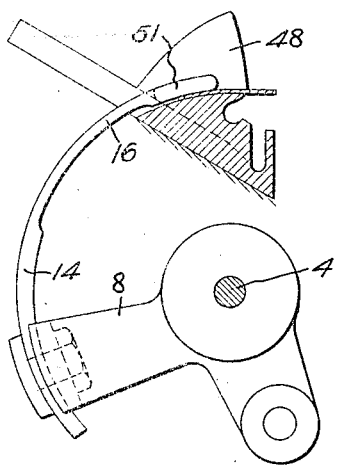
Fig. 12 is a view partially in side elevation and partially in section and representing the binding of one of the thread ends after the formation of the knot but before the tightening thereof.

In my Patent No. 1,112,367 I have shown a device adapted to tie a weaver's knot. The device herein disclosed is primarily intended to tie a weaver's knot, but my invention is not in all aspects thereof limited to the tying of such a knot. In its general organization, the knot tying device herein disclosed is similar to that disclosed in my said patent in that I employ two hooked needles which co-act to tie the threads into a knot, but instead of supporting the mechanism upon the hand of an operator, I provide a handle by which the device may be grasped, and provide means whereby the device may be actuated by impingement upon or against or in engagement with an extraneous object. Therefore, the device is not digitly operated, but on the contrary, and in accordance with the disclosed embodiment of the invention, the device is operated by pressure of an abutment against an extraneous object, such, for example, as the bobbin or spool, as will hereinafter be more fully set forth.

Referring more particularly to the drawings, I have in the several figures represented a casing or housing 1 which may be of the general shape disclosed in my said patent. Therein, as shown most clearly in Fig. 4, I secure a bracket 2 into which is tapped a stud 3, the outer end 4 whereof passes through an opening 5 in the wall of the housing, thereby providing a bearing at the opening 5. The stud 3 is preferably provided with a groove 6 to receive a screw driver by which it may be secured in position. Revolubly supported upon the stud 3 is a bushing 7 fast upon which is a needle carrying member 8 provided with beveled teeth 9 adapted to mesh with similar teeth 10 upon a second needle carrying member 11 provided with a bushing 12 revolubly mounted upon a stud 13 supported by the framing, whereby upon the actuation of the bushing 7 the needles are operated as hereinafter set forth.

Figure 13:
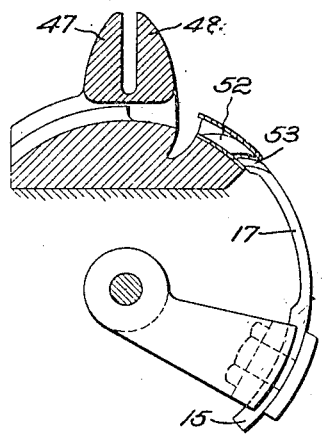
Fig. 13 is a similar view representing the binding of the other thread.

The needle carrying members 8, 11 are provided with hooked needles 14, 15 generally similar to those shown in my said patent. Each of them is, however, cut away as indicated at 16, 17 in Figs. 12 and 13, so as to render them resilient and to insure the binding thereby of the thread ends, as hereinafter set forth. In order to impart rotative movement to the bushing 7, I provide the same with a lever arm 18, shown most clearly in Fig. 3, and provide means operatively connected with said arm and adapted to engage an extraneous object to move said arm. Herein for the purpose I have represented the casing 1 as having a casting or bracket 19 secured thereto and having extending therefrom a generally cylindrical portion 20 receiving a similarly shaped member 21, the outer end 22 of which is herein shown as recessed for the reception of a leather or other plug 23, herein shown as secured in position by a screw 24 tapped into a transverse partition 25 of said member 21. The member 21 constitutes a plunger or abutment, and is provided with a pin 26 adapted to slide in a slot 27 in the member 20 and pivotally connected to a link 28, itself pivotally connected at 29 to the arm 18 of the bushing 7. The outer end 23 of the plunger constitutes a head that is blunt and of substantial area, so that it may engage an extraneous object for the purpose stated, without injury to the device or to said object.

I may, if desired, provide the casing 1 with a rigid bracket 30 which if desired may be grasped by a forefinger when the hand is placed about the handle 31 which, as herein shown, depends at a downward inclination from the casing 1.

The operator in use grasps the handle 31 in the palm of his hand and if desired places his forefinger about the hook or bracket 30. Thus, grasping the device, he presses the end of the plunger or abutment 21 against some extraneous object, such as the spool or bobbin and thus moves the needles 14, 15 inwardly, so that they cross each other as disclosed in my said patent and as indicated in the several views.

Viewing Figs. 1 and 3, it will be observed that the plunger or abutment 21 protrudes from the body of the knot tying device above the handle 31 and also at a point substantially opposite said handle, so that when the abutment or knot tying device is brought into engagement with an extraneous object, the liability is wholly removed or greatly lessened of twisting or unbalancing said device. Moreover the axis of said plunger or abutment is at substantially right angles to the axis of the handle 31, so that the strain of impact of said abutment against the extraneous object is transmitted in the most satisfactory manner to the said handle. Furthermore the said abutment or plunger is so positioned that it is clearly visible to the user when the knot tying device is held in the hand in position for use. Thus, the user may present said abutment or plunger to the desired extraneous object without fear or danger of damage to said knot tying device or of pressing or engaging the body of said knot tying device with the extraneous object rather than the abutment. Viewing Fig. 3, it will also be observed that the shaft 4 carrying one of the needles has a projection 18 which prior to actuation of the device lies in a path substantially normal to the path of movement of said plunger or abutment 21. In that form of the invention shown in Fig. 3, there is provided not only the handle 31 but a rigid member 30 which may be grasped in suitable manner as by the fore-finger. These two handles 30 and 31 are preferably separated to substantially the extent shown, thus giving the two point support and wholly resisting the strain to which the knot tying device is subjected by impact or engagement of the abutment 21 with the extraneous object. These and other results are secured by the employment of an abutment or plunger as herein disclosed. The abutment projects from the body of the knot tying device opposite to the handle thereof and across the body from said handle, thereby to provide a balanced structure in operation. Furthermore, the object-engaging portion of said abutment is symmetrically positioned with respect to the supporting means on the body for said abutment, thereby to facilitate the proper action of the abutment and the operative means controlled thereby. The knot tying device is provided with non-securing, hand grip means herein embodied in the handle 31. The said handle is more firmly held by the clenched thumb and fingers of the hand than is the case of a knotter which is strapped to the hand, so as to be worn constantly thereon, and leaving the fingers of the hand to which the knotter is attached free to engage the bobbin having the broken thread. A firm grip upon the handle 31 is of great importance since the device is intended to be operated by forcible change of position thereof through the aid of said grip means, and preferably by moving the piston 23 forcibly against an extraneous object. Were the handle 31 not effectively gripped, the device would be so turned in or upon the hand as to interfere markedly with or wholly to prevent the proper operation of the knot tying mechanism.

In order to return the needles to their normal or inactive position, I may provide any suitable means, but preferably I attach to the casing or housing 1 a bracket 32, as most clearly shown in Fig. 3, and connect thereto one end of a coil spring 33, the other end thereof being suitably connected to the bushing 7. If desired and preferably I provide a stop 34 against which the bracket 32 takes in the return of the needles to inactive position. In order to sever the threads and preferably so as to leave short, equal length ends, I have provided a member 35 pivoted at 36 in the casing and having spur teeth 37 adapted to mesh with similar teeth 38 upon the needle carrying member 11, as shown most clearly in Figs. 4 and 5. The said member 35 is provided with two cutters indicated at 39, 40, which co-act respectively with stationary cutter members 41, 42, shown most clearly respectively in Figs. 5 and 6.

The two threads are positioned in the device in a manner generally similar to that shown in my said patent. Viewing Figs. 6, 7 and 8, it will be observed that the thread *a* is introduced from one end of the casing and passes through the groove 43 of a casing 44, shown also in Figs. 2 and 3. The thread is then passed through a pigtail or guide 45. The second thread *b* is inserted between a spring 46 (shown most clearly in Figs. 3 and 6) and the adjacent portion of a cutter for the said thread, and is then wrapped about the posts 47, 48, preferably similar in form and function to the corresponding post, shown in my said patent and between which the needle 14 moves. The thread *b* in its course about the post 47, 48 is passed under and then over a yielding hook-like member 49 pivoted at 50 upon the casing and generally similar to the corresponding part shown in my said patent. In practice the thread *b* that is looped about the post 47, 48 is drawn tight so as to snap off the hook-like member 49.

The construction and positioning of the cutters is such that upon thread severance the thread ends are of substantially equal length and are quite short.

Figure 14:
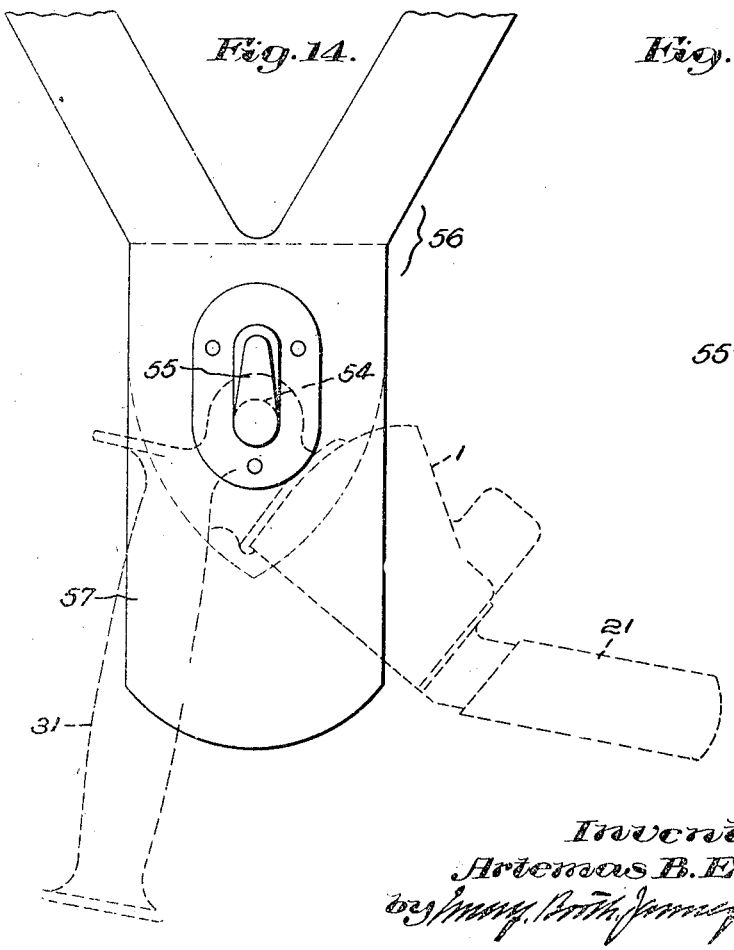
Fig. 14 is a detail representing means for supporting the device when not in use.
Figure 15:
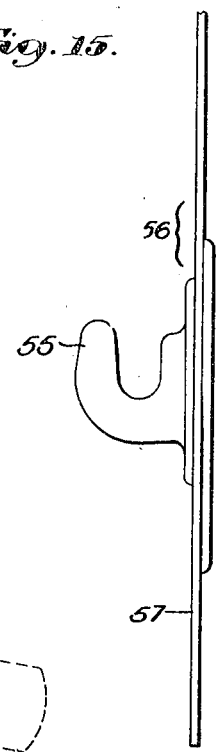
Fig. 15 is a side elevation of the construction shown in Fig. 14.

An important feature of my invention consists in the provision of means whereby each of the needles binds the end of its thread against a surface which is preferably the casing, so that after the threads have been looped into knot form, as indicated at *c* in Fig. 11, but prior to the tightening of the knot, the said thread ends are held so that as the threads or untightened knot are drawn out of the device, as, for example, by the further rotation of the bobbin or spool carrying one of the threads, the knot is tightened against the resistance afforded by the said binding action. The binding action is preferably secured by the heads of the needles, and in Figs. 12 and 13 I have represented the needles 16, 17 as respectively having heads 51, 52, which act to bind the thread ends as therein represented tightly against the underlying portion of the casing. For this purpose I preferably provide the needle 17 with a groove 53 in the side thereof, into which the thread *b* enters and from which it passes to the under side of the needle, as clearly shown in Fig. 13. The resiliency of the needles secured by cutting them away as indicated at 16, 17 assists in the said binding action, which is an important feature of my invention. The device, when not in use, may be supported in any suitable manner For this purpose I preferably provide the framing adjacent the upper end of the handle 31 with an eye 54 adapted to be received upon a hook 55 of a strap-like member 56 shown in part in Fig. 14, and which may be supported about the neck of the operative with the portion 57 thereof in convenient position for receiving the knot-tying device.

It will be clear from the foregoing description that the knot tying device herein disclosed is not secured to the hand of the operator and that I do not provide means for manually operating the device to form a knot. On the contrary, the needles by which the knot is tied are operated by the abutment or plunger which is placed by the operator in contact with some extraneous object and preferably by pushing the same against such object, though it will be evident that within the scope and purpose of my invention the plunger or abutment might be operated by a pulling action thereof, or any other suitable movement. The cutters are actuated in their cutting movement by the inward movement of the plunger 21 and sever the thread ends close to the knot and so as to leave equal lengths.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A knot tying device comprising in combination, a pair of needles, means to actuate the same to tie two threads into a weaver's knot, and means against which both of said needles act to bind the ends of said threads after looping of the threads but prior to tightening the knot.

2. A knot tying device comprising in combination, a frame or support, a pair of needles, and means to actuate the same to tie two threads into a weaver's knot, said frame or support having a surface against which both of said needles bind the thread ends.

3. A knot tying device comprising in combination, a frame or support, a pair of needles, and means to actuate the same to tie two threads into a weaver's knot, said frame or support having a surface against which the ends of both needles bind the thread ends after the looping of the threads but prior to the tightening of the loop into said knot.

4. A knot tying device comprising in combination, two shafts, a needle carried by each shaft, interconnecting means between said shafts, means to apply power directly to one of said shafts, and a support for said shafts, said support having a surface against which both of said needles bind the thread ends in effecting the tightening of the knot.

5. A knot tying device comprising in combination, a pair of needles, means to actuate the same to tie two threads into a knot, and means against which both of said needles bind the thread ends in effecting the tightening of the knot.

6. A knot tying device comprising in combination, a pair of needles, means to actuate the same to tie two threads into a knot, and means against which the ends of both of said needles bind their respective thread ends prior to the tightening of the knot, whereby the knot is tightened when the looped threads are withdrawn from the device.

7. A knot tying device comprising in combination, a pair of needles, means to actuate the same to tie two threads into a knot, and means against which both of said needles bind their respective thread ends prior to the tightening of the knot, whereby the knot is tightened when the looped threads are withdrawn from the device, by the resistance afforded by the binding of the thread ends.

8. A knot tying device comprising in combination, a body, two shafts thereon, a needle carried by each shaft, means for imparting movement of rotation to said shafts, thereby to actuate said needles to tie two threads into a knot, said means including an abutment operatively connected to both said needles and adapted to be moved by engagement with an extraneous object to actuate said needles to tie a knot, said abutment for protruding laterally from said body when the device is held in position for use.

9. A knot tying device comprising in combination, a body, two shafts thereon, a needle carried by each shaft, and means for imparting movement of rotation to said shafts, thereby to actuate said needles to tie two threads into a knot, said means including a to and fro movable abutment operatively connected to both of said means and adapted to be pressed against an extraneous object to actuate said needles to tie a knot, said abutment extending laterally and upwardly from said body when the device is held in position for use.

10. A knot tying device comprising in combination, two shafts, a needle carried by each shaft, and means for imparting oscillatory movement to said shafts to move said needles to and fro across each other and to move each thread across the other to tie said two threads into a knot, said means including an abutment operatively connected to both of said needles and having a blunt head 23 adapted to be moved by engagement with an extraneous object, thereby to actuate said needles.

11. A knot tying device comprising in combination, two shafts mounted for rocking movement, a needle carried by each shaft, operative connections between said shafts to move said needles to tie a knot, means against which both of said needles act to bind the ends of the threads after looping of the threads and a member operatively connected to one of said shafts and adapted to be moved by engagement with an extraneous object, thereby to actuate said needles to tie said knot.

12. A knot tying device comprising in combination, two shafts mounted at substantially right angles to each other, a needle carried by each shaft, operative connections between said shafts, whereby the needles are moved in intersecting planes, means against which both of said needles act to bind the ends of the threads after looping of the threads, and a plunger operatively connected to one of said shafts and adapted to be moved by engagement with an extraneous object, thereby to actuate said needles to tie a knot.

13. A knot tying device comprising in combination, two shafts, toothed gears connecting said shafts, a needle carried by each shaft, a plunger adapted to engage an extraneous object, and an operative connection between said plunger and one of said shafts.

14. A knot tying device comprising in combination, a body having a handle non-attachable to the hand but adapted to be grasped thereby, a pair of shafts upon said body, a needle carried by each shaft, interconnecting means between said shafts, a plunger having connections to one of said shafts and adapted to be pressed against an extraneous object to move the needles in one direction, said plunger protruding laterally from the body of said device when the latter is held in position for use, and a spring operatively connected to said shafts to move said needles in the opposite direction.

15. A knot tying device comprising in combination, a pair of shafts whose axes intersect, a needle carried by each shaft, interconnecting means between said shafts, thereby to move said needles in intersecting planes, a plunger having connections to one of said shafts and adapted to be pressed against an extraneous object to move the needles in one direction, and a spring operatively connected to said shafts to move said needles in the opposite direction.

16. A knot tying device comprising in combination, a pair of shafts, a needle carried by each shaft, interconnecting means between said shafts, a pivoted member having two cutters for the two thread ends, and operative connections between said member and said shafts.

17. A knot tying device comprising in combination, two shafts, a needle carried by each shaft, interconnecting means between said shafts, a pivoted member, gearing connecting said member and one of said shafts, and two cutters carried by said member to sever the thread ends.

18. A knot tying device comprising in combination, two shafts, gearing connecting said shafts, a needle carried by each shaft, a plunger having a pivotal connection to one of said shafts, thereby to move the same in one direction, and a spring to move said shafts in the opposite direction.

19. A knot tying device comprising in combination, two shafts, gearing connecting said shafts, a needle carried by each shaft, a plunger having a pivotal connection to one of said shafts, thereby to move the same in one direction, a spring to move said shafts in the opposite direction, a pivoted member, gearing connecting said member to one of said shafts, and cutters carried by said pivoted member to sever the thread ends.

20. A knot tying device comprising in combination, two shafts, interconnecting means between said shafts, a needle carried by each shaft, a support for said shafts, having a surface against which both of said needles bind the thread ends in effecting the tightening of the knot, and a member operatively connected to both of said needles and adapted to engage an extraneous object, thereby to actuate said needles to tie a knot.

21. A knot tying device comprising in combination, two shafts, a toothed gear upon each of said shafts in operative relation to each other, a needle carried by each shaft, a plunger adapted to engage an extraneous object, and an operative connection between said plunger and one of said shafts.

22. A knot tying device comprising in combination, a pair of needles, means to actuate the same to move to and fro across each other and to move the thread across each other to tie said two threads into a weaver's knot, means against which both of said needles act to bind the ends of the threads after looping of the threads, an abutment operatively connected to both of said needles and adapted to be engaged by an extraneous object to actuate said needles to tie said knot, and a thread guide positioned where the needles cross each other and about which one of the threads is to be wrapped prior to thread manipulation by the needles.

23. A knot tying device comprising in combination, a pair of needles, means to actuate the same to move to and fro across each other and to move the thread across each other to tie said two threads into a weaver's knot, an abutment operatively connected to both of said needles and adapted to be pressed against an extraneous object to actuate said needles to tie said knot, said abutment having a right line movement, said abutment protruding from the body of the knot tying device and clearly visible to the user of the device when said device is in position for use, and a divided thread guide through which one needle moves and past which the other needle moves in thread manipulation.

24. A knot tying device comprising in combination, a body having a handle, a shaft, two needles operatively connected thereto and adapted to tie two threads into a knot, a movable abutment operatively connected to said shaft and adapted by its movement to move said shaft, and thereby impart movement to said needles, said abutment protruding from the body of the knot tying device at a point substantially opposite to the handle and having a blunt head 23 to engage an extraneous object.

25. A knot tying device comprising in combination, a shaft, two needles operatively connected thereto and adapted to tie two threads into a knot, a movable abutment having a right line movement, means connecting said abutment and shaft to convert said right line movement into a rotative movement of said shaft, and thereby impart movement to said needles, said abutment protruding from the body of the knot tying device and clearly visible to the user of the device when the knot tying device is in position for use.

26. A knot tying device comprising in combination, a body having a handle, a shaft, two needles operatively connected thereto and adapted to tie two threads into a knot, a movable abutment, means including link 28 operatively connecting said abutment and shaft to move the latter, and thereby impart movement to said needles, said abutment protruding from the body of the knot tying device outwardly into ready view of the user when the device is held by said handle in normal manner for operation.

27. A knot tying device having a shaft provided with an operating projection, two needles operatively connected to said shaft and adapted to tie two threads into a knot, a movable abutment protruding from the body of the knot tying device and operatively connected to said projection, said abutment being itself movable in a path substantially normal to said projection when in a condition of rest.

28. A knot tying device comprising in combination, a body having two shafts 4 and 14, needles 16 and 17 carried by said shafts, gears 9, 10 on and connecting said shafts, a handle 31 extending from said body, said body having a portion 20 protruding therefrom, a plunger 21 movable upon said portion 20, and an operative connection 18, 28 between the shaft 4 and said plunger.

29. A knot tying device comprising in combination, two shafts, a needle carried by each shaft, means for imparting oscillatory movement to said shafts, thereby to actuate said needles to tie two threads into a weaver's knot, and an abutment having a right line movement and operatively connected to both of said needles and adapted to be moved by engagement with an extraneous object, thereby to actuate said needles to tie a knot.

30. A knot tying device comprising in combination, a handle non-attachable to the hand but adapted to be grasped thereby, a pair of shafts, a needle carried by each shaft, means to impart a movement of rotation to both of said shafts to tie two threads into a weaver's knot, and a plunger operatively connected to both of said shafts and adapted to be moved by pressure against an extraneous object, thereby to actuate said needles to tie said knot.

31. A knot tying device comprising in combination, two shafts, beveled gears connecting said shafts, a needle carried by each shaft, a plunger adapted to engage an extraneous object and an operative connection between said plunger and one of said shafts.

32. A knot tying device comprising in combination, two shafts, a toothed gear upon each of said shafts in operative relation to each other, a needle carried by each shaft, a movable abutment adapted to engage an extraneous object, and an operative connection between said movable abutment and one of said shafts.

33. A knot-tying device comprising in combination a handle non-attachable to the hand but adapted to be grasped thereby, a shaft, means to impart a movement of rotation to said shaft, two needles operatively connected to said shaft and adapted by the movement of the latter to be moved to tie two threads into a knot, and an abutment operatively connected to said shaft and adapted to be moved by engagement with an extraneous object thereby to actuate both of said needles to tie said knot.

34. A knot-tying device comprising in combination, a body having a handle and a shaft, two needles operatively connected to said shaft and adapted by actuation thereof to tie two threads into a knot, and means associated in action with said shaft whereby movement of the body in an upward direction when held in normal position for operation, effects the said actuation of said shaft.

35. A knot-tying device comprising in combination, a body having a handle and a shaft, two needles operatively connected to said shaft and adapted by actuation thereof to tie two threads into a knot, supporting means on said body and an abutment adapted to engage an extraneous object, the object-engaging portion of said abutment being symmetrically positioned with respect to said supporting means, and an operative connection between said abutment and said shaft.

36. A knot-tying device comprising in combination, a body, a handle extending from said body, a shaft supported by said body, two needles operatively connected to said shaft and adapted by actuation thereof to tie two threads into a knot, and an abutment extending from said body in a direction substantially normal to said handle and having an operative connection to said shaft, said abutment being adapted to engage an extraneous object to operate said knot-tying device.

37. A knot-tying device comprising in combination, a body, a handle extending therefrom at an inclination forwardly and downwardly, a shaft supported by said body, two needles operatively connected to said shaft and adapted by actuation thereof to tie two threads into a knot, and an abutment extending from said body in a direction substantially normal to said handle, and having an operative connection to said shaft, said abutment being adapted to engage an extraneous object to operate said knot-tying device.

38. A knot-tying device comprising in combination, a body having a shaft and knot-tying means operatively connected to said shaft and adapted by actuation of said shaft to tie two threads into a knot, a handle projecting from said body, and an abutment adapted to engage an extraneous object, said abutment projecting from said body opposite to said handle and across the body from said handle, thereby to provide a balanced structure in operation, and an operative connection between said abutment and said shaft.

39. As an article of manufacture, a knot tying device provided with non-securing, hand grip means and comprising knot tying mechanism having a relatively movable actuator presented for external engagement upon forcible change of position of said device by the aid of said grip means.

40. As an article of manufacture, a knot tying device provided with non-securing, hand grip means and comprising knot tying mechanism having an actuator pusher presented to be pushed by the aid of said grip means against an extraneous object for operating the said knot tying mechanism.

In testimony whereof, I have signed my name to this specification.

ARTEMAS B. EDMANDS.